United States Patent Office 3,285,027
Patented Nov. 15, 1966

3,285,027
PULSED CRYSTAL REFLUX WITH A
MINIMAL MELT
Dwight L. McKay, Bartlesville, Okla., assignor to Phillips
Petroleum Company, a corporation of Delaware
Filed Nov. 25, 1964, Ser. No. 416,188
6 Claims. (Cl. 62—58)

This application is a continuation-in-part of Serial No. 215,152, filed August 6, 1962.

This invention relates to the resolution of liquid multi-component mixtures by crystallization. In another aspect, it relates to a process and apparatus for the separation of multi-component mixtures and the purification of crystals. In another of its aspects, the invention relates to a process for the separation of multi-component mixtures and the purification of crystals wherein the multi-component mixture is passed into a crystallization column, a portion of the mixture is crystallized, another portion of the mixture is removed as mother liquor, the crystals are passed through the column and melted to form a melt holdup volume, a portion of the melt holdup volume is refluxed into the crystals, and wherein the melt holdup volume is minimized so as to prevent channeling but at a sufficient volume so as to provide effective refluxing of the crystals. In another aspect, the invention relates to a process for the separation of multi-component mixtures and the purification of crystals wherein the melt holdup volume is varied according to the diameter of the column employed.

In a still further aspect of the invention, it relates to an apparatus for fractionally crystallizing a mixture of crystallizable components, the apparatus comprising a purification column, means for crystallizing at least a portion of the mixture, means for removing another portion of the mixture from the column as a mother liquor, means for remelting the crystallized material, means for refluxing at least a portion of the melted crystallized material, and means for maintaining the melt holdup volume within a certain range, limited by a function of the diameter of the column.

Purification by means of fractional crystallization has been known for a number of years. Schmidt, Re. 23,810 (1954), discloses a process and apparatus for purifying crystals, which process involves moving a mixture of crystals and adhering liquid through a liquid removal zone, a reflux zone and a melting zone, removing liquid in said liquid removal zone, melting crystals in said melting zone, withdrawing part of the melt as product and forcing another part of the melt in a direction counter-current to the movement of crystals in said reflux zone. This process is generally applicable to the separation of at least one pure component from any mixture which is resolvable into its components by fractional crystallization. For example, the process can be used for the concentration of fruit juices, vegetable juices, and other materials which comprise aqueous solutions which can be concentrated by the formation and removal of ice crystals. The process is also of great value in the resolution of non-aqueous mixtures, an example of such an application being the separation of para-xylene from a mixture therefor with the other xylene isomers and ethyl benzene.

An improvement in the separation of the type described above is that of Thomas, U.S. Patent No. 2,854,494 (1958), which discloses and claims a process wherein the solids in the purification zone are countercurrently contacted with a pulsating flow of reflux liquid by application of pulsating pressure against the melt, the pulsation of the reflux liquid occurring during sustained application of force to the crystals to feed the same into the liquid removal zone. While this improved process has been carried out with much success, one problem which frequently occurs in connection therewith is that of channeling of reflux liquid (melt) through the mass of crystals in the reflux zone. It is this problem of channeling which is the primary concern of this invention.

I have now found that channeling can be minimized and efficiency of operation maximized when the melt holdup volume is kept to a minimum without being too low so as to cause inadequate refluxing of the crystals.

By various aspects of this invention, one or more of the following, or other, objects can be obtained.

Accordingly, an object of this invention is to provide an improved process and apparatus for purifying crystals, which overcomes in particular the problem of channeling of reflux liquid through the mass of crystals in the reflux zone.

It is a further object of this invention to provide a process and apparatus for fractionally crystallizing a mixture of crystallizable material wherein channeling is minimized and efficiency of operation is maximized.

Other aspects, objects, and the several advantages of this invention are apparent to one skilled in the art from a study of the disclosure, the drawings, and the appended claims.

According to the invention, I have now discovered that the crystal purification process described above, wherein a pulsating pressure is applied against the melt, can be improved by limiting the holdup volume of melt as a function of the diameter of the purification column. The relationship between the holdup volume (V) and diameter (D) can be expressed by the equation:

$$V = 0.033 D^{1.98}$$

where

V = holdup volume, gallons
D = column diameter, inches

By maintaining the volume of holdup (or surge) within V, or plus-or-minus 25 percent, preferably plus-or-minus ten percent, thereof, I have discovered that the channeling of reflux liquid (melt) in the crystal bed adjacent the heater means-crystal barrier assembly can be minimized or prevented, the operation of the purification column can be stabilized and improved, and the column throughput and product purity increased.

The invention can be best understood by reference to the accompanying drawings in which.

Figure 1:
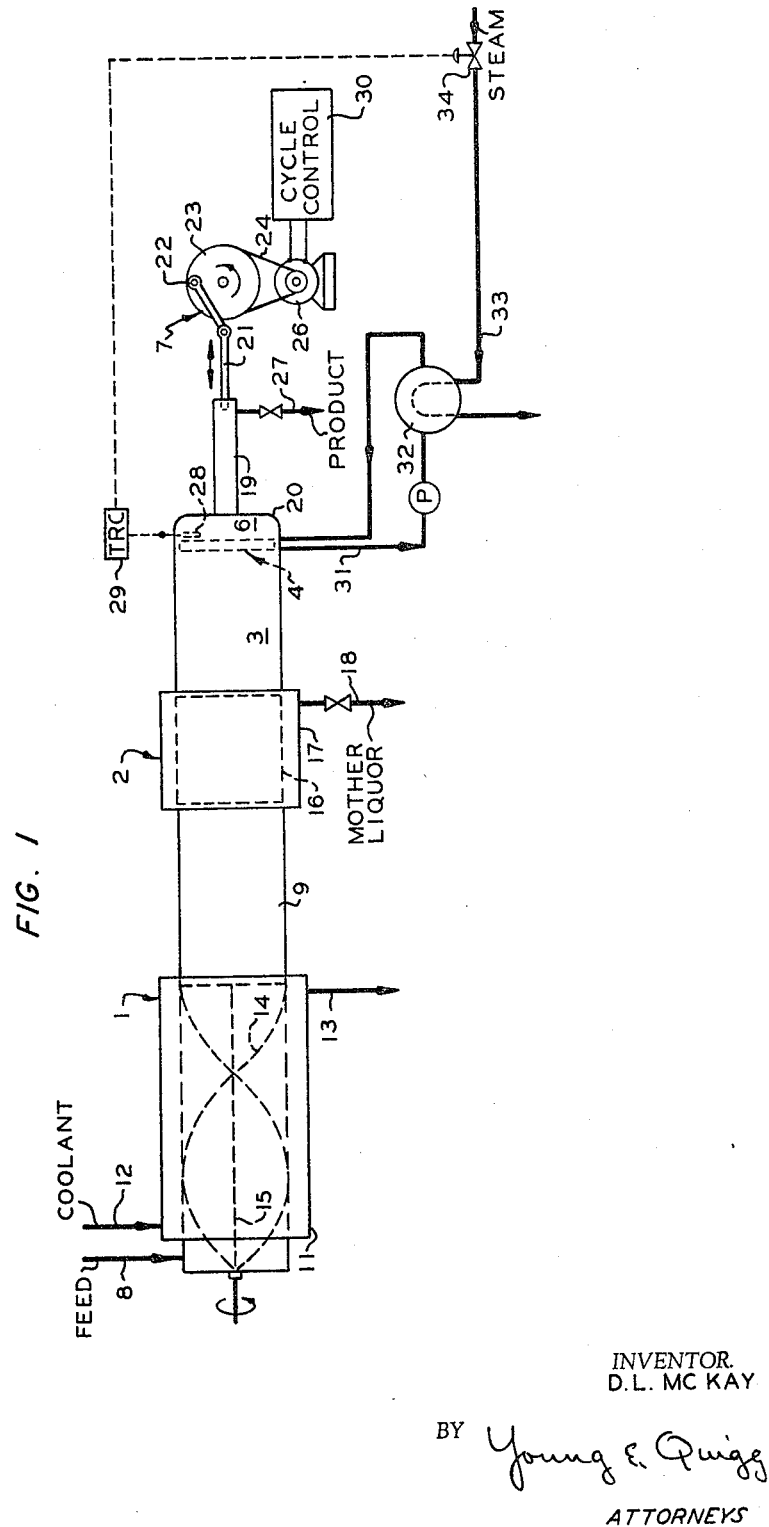
FIGURE 1 is an elevational view, partly in section, illustrating one embodiment of this invention.

Referring now to FIGURE 1 of the drawing, there is illustrated a fractional crystallization apparatus with features of this invention associated therewith, the apparatus comprises freezing or crystallizing means 1, a filtering means 2, a reflux zone 3, a melting zone in which is disposed a heating means-crystal barrier assembly 4, a surge zone 6 containing melted crystals, and a pulsation-producing device 7. It is the volume of surge zone 6, i.e., the holdup of melt, that I propose to limit by the expression I defined above.

A feed mixture comprising two or more components, one of which is separable from the mixture by crystallization, is pumped into the apparatus through feed inlet 8 into crystallizing section 1 of the main purification column. This crystallizing section 1 is composed of a cylindrical shell 9, to which is attached a cooling jacket 11 having an inlet 12 and outlet 13 for a coolant. Positioned within the crystallizing section is an agitating or scraping means 14, which is designed to prevent the accumulation of solid material on the heat exchange surface. Scraping means 14 is suitably constructed of strips of metal fabricated in the form of a helix and mounted on a rotatable shaft 15. Any other suitable type of scraping means can be used. Sufficient cooling in the crystallizing section 1 is provided so that a predetermined amount of solid crystals is produced. The resulting crystal mass and mother liquor are passed into the filtering means 2.

Filtering means 2 comprises a suitable filter 16, such as a metallic screen, a sintered perforate metal member or a perforate metal member supporting a filter cloth, this filter being positioned integrally with respect to the shell 9. The filter 16 is surrounded by an external shell 17 having an outlet 18 for filtrate (mother liquor). The remaining crystal mass passes through reflux zone 3 wherein it is contacted in a countercurrent manner with liquid reflux produced as subsequently described.

A melting zone is maintained near the downstream end of the crystallizing apparatus and it is here where the heating means-crystal barrier assembly 4 is located. Assembly 4 comprises a heater, such as an electrical heater or a heat transfer coil through which a suitably heated fluid is pumped, and a crystal barrier, such as one or more perforate plates and screens. Assembly 4 causes the melting of the crystal bed adjacent thereto and serves as a barrier to prevent crystals from passing into the end of the column to which a product outlet cylinder 19 is attached. Cylinder 19 is attached to the downstream closure plate 20 of the apparatus, for example by welding, and reciprocally mounted therein is a rod or piston 21, which is attached to a crank means 22, the latter being rotated by means of sheave 23, belt 24 and motor 26. A cycle control device 30, of known design, is operatively connected to motor 26 so that an electrical pulse is produced in synchronism with pulsating rod 21, the frequency of pulses being, for example, from 50 to 400 pulses per minute. Cylinder 19 is provided with an outlet pipe 27 for removal of some of the melt as the purified product of the process. The remainder of the melt is forced through assembly 4 into the reflux zone 3 to effect crystal purification.

The sum of the volumes of closure plate 20 and cylinder 19 is equal to the surge or holdup volume 6, which contains the pulsating melt. If the volume of this pulsating melt exceeds the volume defined by expression I above, channeling of reflux melt in the crystal bed will occur, and if the volume of pulsating melt is below this defined volume the column will not obtain the full benefits of pulsation and reflux.

A suitable thermocouple 28 or the like can be transversely mounted adjacent the heater means-crystal barrier assembly 4 and it is operatively connected to a suitable temperature recorder controller 29. Assembly 4 can comprise a heating coil in which is circulated a heat exchange medium, such as hot water, the coil being connected by line 31 to a suitable heat exchanger 32, where heat is supplied by a suitable heat exchanger medium, such as steam 33. The melting of the crystals by the apparatus can accordingly be controlled by regulating the flow of heat exchange medium in line 33 by flow control valve 34, which is operatively connected to temperature recorder controller 29.

Figure 2:
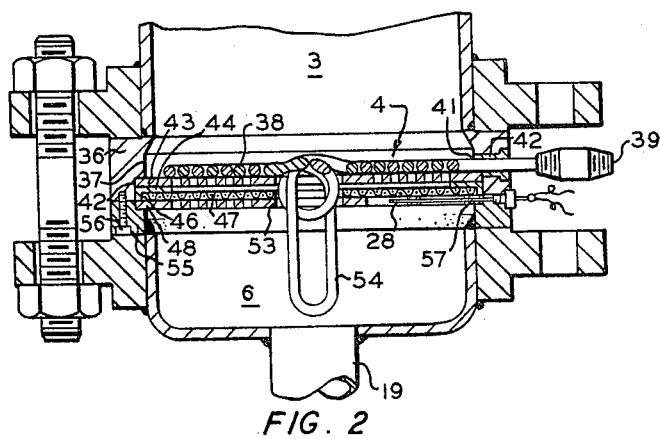
FIGURE 2 is an elevational view in cross section of a portion of FIGURE 1 in detail.
Figure 3:
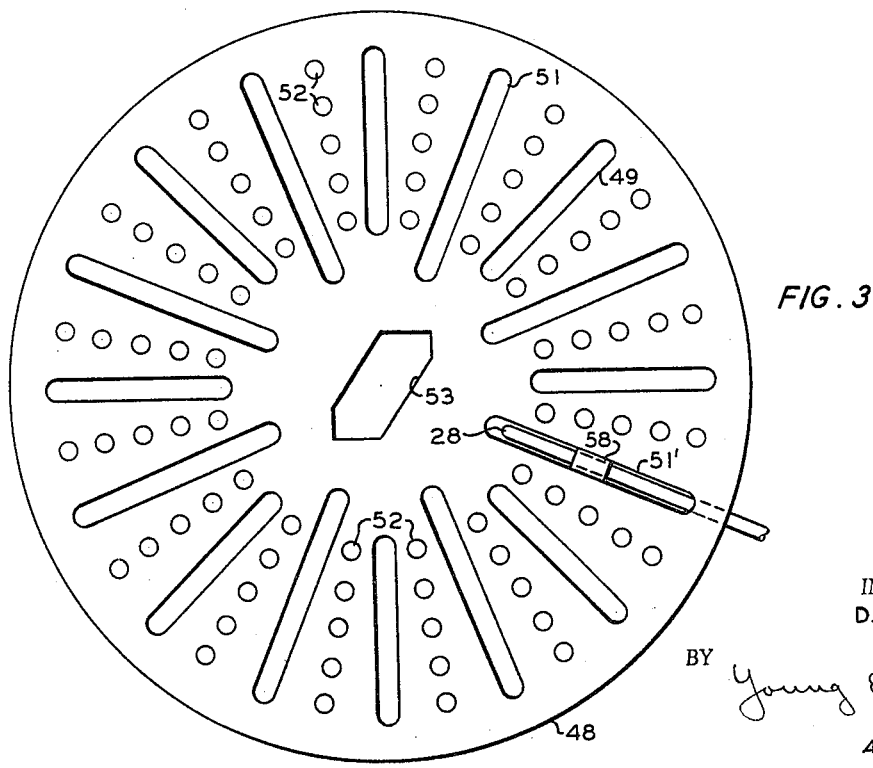
FIGURE 3 is a plan view of an element of FIGURE 2 illustrating details thereof.

Referring now to FIGURES 2 and 3, the heater means-crystal barrier assembly 4, is shown in detail. This assembly comprises a heater ring 36 having a recessed portion 37 within which heating coil 38 is positioned. End 39 of the heating coil 38 passes through an opening 41 in the side of the heater ring 36. The other end of the heater coil is not shown but it also passes through an opening similar to opening 41 in the heater ring 36. A suitable bushing or seal 42 in each of holes 41 is provided to prevent leakage of liquid from the apparatus.

Heating ring 36 is also provided with a second recessed portion 42, somewhat larger in diameter than recessed portion 37, in which a back-up plate 43 is disposed, which serves to support the heating coil, and, because of perforations therein, allows liquid to pass therethrough. A spacer ring 44 is positioned next to the back-up plate 43 in the second recessed portion 42, and it has a recessed portion 46 in which one or more screens 47 are positioned, such as 24×10 mesh Dutch screen, or a pair of such screens. Screen 46 is held in place and supported by a second back-up plate 48 which is also disposed in the second recessed portion 42 of the heater plate 36. The second back-up plate (or screen back-up plate) 48 is shown in detail in FIGURE 3. It is like that of the heater back-up plate 43, both of such plates have perforations which provide coincident continuous passageways for liquid. These passages preferably comprise a plurality of alternate short radial slots 49 and long radial slots 51 with a plurality of small radial holes 52 therebetween, the center of the plate being provided with an opening 53 through which part 54 of the heating coil can depend. Heating coil 38, back-up plate 43, spacer ring 44, screen 47 and back-up plate 48 are all held in position within the recessed portions of the heater ring 36 by means of a retaining ring 55, which is attached to the heater ring by means of screws 56. Retaining ring 55 and back-up plate 48 are provided with a passage 57 for insertion of thermocouple 28, the inner portion of the thermocouple being disposed in one of the radial slots 51' of the back-up plate 48, its position being maintained by a bushing 58, for example made of Teflon or other similar resin, wedged within said slot 51'.

The crystallizing and purification apparatus of this invention can be used to resolve mixtures comprising any combination of two or more components, such as those disclosed in said U.S. Patents Re. 23,810 and 2,854,494. The subject invention has proven especially useful in resolving a mixture of xylenes to recover para-xylene.

*Example*

A xylenes mixture containing 65 percent para-xylene was resolved in various diameter columns. In each case, the hold-up volume was varied to achieve a minimum of channeling with a maximum of efficiency of separation of the para-xylene. The results of such tests are tabulated below.

TABLE

| Column diameter (in.) | 16 | 10 | 16 | 22 |
|---|---|---|---|---|
| Length of Column Sections, inches: | | | | |
| Prefilter, 9 of Figure 1 | 12 | 20 | 32 | 44 |
| Filter, 2 of Figure 1 | 6 | 10 | 16 | 22 |
| Reflux, 3 of Figure 1 | 12 | 12 | 16 | 22 |
| Pulse frequency (cycles/min.) | 250 | 220 | 220 | 200 |
| Pulse displacement (cu. in.) | 6 | 13 | 33 | 100 |
| Volume of melt hold-up (gal.) | 1.2 | 3.3 | 8 | 15 |
| Product rate (gal./hr.) | 32 | 82 | 120 | 170 |
| Purity (percent) | 98+ | 99 | 99.3 | 99+ |

In the tests, when the hold-up volumes were greater than that listed above for each size column, the operation of the column would tend to be unstable because channels would tend to form in the reflux area. When the hold-up volume was reduced below that volume given above for each size column, the purity of the product decreased because of inadequate refluxing.

When the values for the column diameter were plotted on log-log paper with the corresponding values for the melt hold-up volume, a straight line relationship was obtained. Thus, a relationship between the hold-up volume and the column diameter was found to exist. That relationship can be expressed by the formula $$V = 0.033 D^{1.98}$$

where $V$ = melt hold-up volume, gallons
$D$ = column diameter, inches

Thus, as can be seen from the above tests and determination, it was discovered that the melt holdup volume is an important variable in achieving stable operation for a crystallizer column and the efficiency of the column can be maximized if, given a constant set of conditions including the column diameter for a crystallizer column, the melt holdup volume is determined according to the above formula.

Wherein the holdup volume is within the range of plus-or-minus 25 percent of the volume as defined by the formula which substantially includes all holdup formulas which are operative in the general situations in the field, it is particularly noted as an additional feature of the invention that not more than about plus-or-minus ten percent V for a holdup volume will yield excellent results.

Reasonable variation and modification are possible within the scope of the foregoing disclosure, the drawings, and the appended claims of the invention, the essence of which is that in a crystal purification column wherein a crystallizable material is separated from a mixture of materials, wherein the crystallizable material is passed through a column of a given diameter, wherein a portion of the mixture is removed from the column as a mother liquor, wherein the crystallizable material moves through the column as crystals, wherein the crystals are remelted and a portion of the melt is passed back into the crystals, and a portion of the melted crystals forming a melt holdup volume, wherein a pulsating pressure is applied to said melt holdup volume at a constant rate, the melt holdup volume is maintained at a value low enough so that channeling is minimized and refluxing of the crystals is effective, and that a formula for calculating said melt holdup volume has been discovered.

I claim:

1. In a process comprising passing a mass of crystals and mother liquor through a crystallization column having a liquid removal zone, a reflux zone, and a melt zone, removing said mother liquor from said liquid removal zone, countercurrently contacting said crystals in said reflux zone with a pulsating stream comprising a melt of said crystals, the crystals in said reflux zone and said melt of said crystals being distributed over substantially the same cross-sectional area of said column, melting said crystals in said melting zone, applying a pulsating pressure against said melt at a constant rate, and withdrawing a part of said melt from said column as the product of the process, the improvement comprising passing said melt from said melting zone into a melt surge zone to which said pulsating pressure is applied and from which said product is withdrawn and maintaining said volume of said melt surge zone at a minimum so as to minimize channeling but at a large enough value so that effective refluxing occurs, said volume of said melt surge zone available for refluxing being maintained at a value of plus or minus 10 percent of the volume defined by $V = 0.033 D^{1.98}$, where V is equal to the volume in gallons of said melt surge zone and D is the diameter in inches of said column in said reflux zone and in said melt zone.

2. A process according to claim 1 wherein said volume is equal to V.

3. A process according to claim 2 wherein said rate of pulsating pressure is about 200 cycles per minute.

4. An apparatus for the separation of components of a liquid mixture, comprising, in combination, a cylindrical purification column, cooling means adjacent one end of said column for crystallizing at least a portion of said liquid mixture, crystal moving means in said one end of said column for moving crystals through said column, filter means in said column for removing another portion of said liquid mixture as a mother liquor, a heating means-crystal barrier assembly adjacent the other end of said column for heating said crystals, a crystal purification section between said filter means and said heating means-crystal barrier assembly, a melt surge section adjacent said heating means-crystal barrier assembly, the cross-sectional area through said column in said crystal purification section and in said melt surge section adjacent said heating means-crystal barrier assembly being substantially equal, product withdrawal means adjacent said melt surge section, pulsation means within said surge section for providing a pulsating stream at a fixed rate, said surge section having a volume low enough such that channeling will be minimized and large enough so as to provide for efficient refluxing of the crystals said volume of said melt surge section being equal to plus or minus 10 percent of the volume defined by the expression: $V = 0.033 D^{1.98}$, where V is equal to the volume in gallons of the surge section and D is the diameter in inches of said column in said crystal purification section and in said melt surge section.

5. An apparatus according to claim 4 wherein said volume of said melt surge section is equal to V.

6. An apparatus according to claim 4 wherein there is provided a thermocouple means projecting transversely into said column adjacent said heating means-crystal barrier assembly, and means responsive to said thermocouple means to control the temperature of melt product withdrawn from said surge section.

References Cited by the Examiner

UNITED STATES PATENTS

| | | |
|---|---|---|
| 2,854,494 | 9/1958 | Thomas. |
| 2,890,962 | 6/1959 | Eddy. |
| 2,894,997 | 7/1959 | Hachmuth. |
| 2,919,991 | 1/1960 | Ratje _____ 260—707 X |

NORMAN YUDKOFF, *Primary Examiner.*